US009689479B2

(12) United States Patent
Seebauer

(10) Patent No.: US 9,689,479 B2
(45) Date of Patent: Jun. 27, 2017

(54) MACHINE TOOL

(71) Applicant: Ralf Seebauer, Murrhardt (DE)

(72) Inventor: Ralf Seebauer, Murrhardt (DE)

(73) Assignee: C. & E. Fein GmbH (DE)

( * ) Notice: Subject to any disclaimer, the term of this patent is extended or adjusted under 35 U.S.C. 154(b) by 505 days.

(21) Appl. No.: 14/261,864

(22) Filed: Apr. 25, 2014

(65) Prior Publication Data
US 2014/0318286 A1 Oct. 30, 2014

(30) Foreign Application Priority Data

Apr. 26, 2013 (DE) .......................... 10 2013 104 271

(51) Int. Cl.
| *B24B 23/04* | (2006.01) |
| *F16H 25/16* | (2006.01) |
| *B24B 23/02* | (2006.01) |
| *B27B 19/00* | (2006.01) |
| *B25F 5/00* | (2006.01) |
| *B23Q 5/027* | (2006.01) |
| *B23D 51/16* | (2006.01) |

(52) U.S. Cl.
CPC ............. *F16H 25/16* (2013.01); *B24B 23/02* (2013.01); *B24B 23/04* (2013.01); *B25F 5/001* (2013.01); *B27B 19/006* (2013.01); *B23D 51/16* (2013.01); *B23Q 5/027* (2013.01); *Y10T 74/18296* (2015.01)

(58) Field of Classification Search
CPC  B24B 7/16; B24B 7/184; B24B 23/03; B24B 23/04; B24B 23/028; B24B 27/08; B24B 41/042; B24B 23/00; B25B 21/001; B25B 21/004; B25B 23/00; B25B 28/00; B25F 5/00; B27B 19/006; B27B 19/00; B23Q 5/04; B23Q 5/027; B25D 11/062; Y10T 74/18056; Y10T 74/1824
USPC .............. 173/49, 216, 217, 109, 162.1, 205; 451/344, 356, 357, 163, 359, 270; 81/57.11, 429; 30/218, 166.3
See application file for complete search history.

(56) References Cited

U.S. PATENT DOCUMENTS

| 440,902 | A | * | 11/1890 | Silver ..................... B26B 19/28 30/217 |
| 2,278,657 | A | * | 4/1942 | Kline ..................... B24B 35/00 451/164 |
| 2,350,098 | A | * | 5/1944 | Decker ................... B24B 23/04 451/163 |

(Continued)

FOREIGN PATENT DOCUMENTS

| CN | 101909815 A | 12/2010 |
| CN | 101992459 A | 3/2011 |

(Continued)

*Primary Examiner* — Scott A. Smith
(74) *Attorney, Agent, or Firm* — St. Onge Steward Johnston & Reens, LLC

(57) ABSTRACT

A motor-driven machine tool has a drive motor, the motor shaft of which is driven in rotation, with a tool drive shaft, which is driven in rotation or in oscillation about its longitudinal axis, and with a coupling drive for converting the rotational movement of the motor shaft into a driving movement of the tool drive shaft. Furthermore, a coupling is provided, which compensates an angular offset or change in position between the motor shaft and tool drive shaft which deviates from an axially parallel or right-angled arrangement of the two shafts.

13 Claims, 7 Drawing Sheets

(56) References Cited

U.S. PATENT DOCUMENTS

| | | | | |
|---|---|---|---|---|
| 4,150,511 A * | 4/1979 | Khokhulin | ............. | B24B 35/00 451/173 |
| 4,347,450 A | 8/1982 | Colligan | | |
| 4,613,000 A * | 9/1986 | Moore | .................... | B25B 15/02 173/13 |
| 4,748,872 A * | 6/1988 | Brown | ................. | B25B 21/001 81/57.26 |
| 4,827,615 A * | 5/1989 | Graham | ................. | A61B 17/14 30/166.3 |
| 5,237,884 A * | 8/1993 | Seto | ..................... | B27B 19/006 30/166.3 |
| 5,398,454 A * | 3/1995 | Berner | ................... | B24B 23/04 451/357 |
| 5,425,666 A * | 6/1995 | Frank | ...................... | B24B 23/03 451/344 |
| 5,768,933 A * | 6/1998 | Tanner | ................... | B27B 19/006 30/218 |
| 5,885,145 A * | 3/1999 | O'Mara | ............... | A46B 13/008 15/22.2 |
| 5,902,107 A * | 5/1999 | Lowell | .................... | A61C 1/12 433/112 |
| 5,993,304 A * | 11/1999 | Eriksson | ................ | B23Q 5/027 451/356 |
| 6,129,618 A * | 10/2000 | Frech | ................... | B24B 23/04 451/344 |
| 6,230,717 B1 * | 5/2001 | Marx | ................... | A61C 17/221 132/308 |
| 6,316,890 B1 | 11/2001 | Gmeilbauer | | |
| 6,503,082 B1 * | 1/2003 | Takahashi | ............ | A61C 17/005 132/73.6 |
| 6,926,595 B2 * | 8/2005 | Pollak | .................... | B24B 23/04 451/270 |
| 7,108,077 B2 * | 9/2006 | Zaiser | .................... | B23Q 5/027 173/109 |
| 8,381,833 B2 * | 2/2013 | Bernardi | ................. | B25B 28/00 173/162.1 |
| 8,397,832 B2 * | 3/2013 | Blickle | ................. | B24B 23/028 173/109 |
| 8,757,285 B2 * | 6/2014 | Weber | .................... | B24B 23/04 173/216 |
| 8,881,409 B2 * | 11/2014 | Haman | ................. | B27B 19/006 173/217 |
| 2006/0205293 A1 * | 9/2006 | Fuse | ...................... | B63H 23/34 440/83 |
| 2009/0266571 A1 | 10/2009 | Baumann et al. | | |
| 2009/0308213 A1 | 12/2009 | Zaiser et al. | | |
| 2009/0311952 A1 * | 12/2009 | Zaiser | .................... | B24B 23/04 451/357 |
| 2011/0011608 A1 | 1/2011 | Saur | | |
| 2011/0036609 A1 | 2/2011 | Blickle et al. | | |
| 2011/0048753 A1 | 3/2011 | Zaiser | | |
| 2014/0020918 A1 * | 1/2014 | Klabunde | ............. | B23D 47/12 173/49 |

FOREIGN PATENT DOCUMENTS

| | | |
|---|---|---|
| DE | 19733796 A1 | 2/1999 |
| DE | 102005059180 A1 | 6/2007 |
| EP | 2139647 B1 | 4/2011 |
| JP | S6274564 A | 4/1987 |
| JP | H0641099 B2 | 6/1994 |
| WO | 9521039 A1 | 8/1995 |

\* cited by examiner

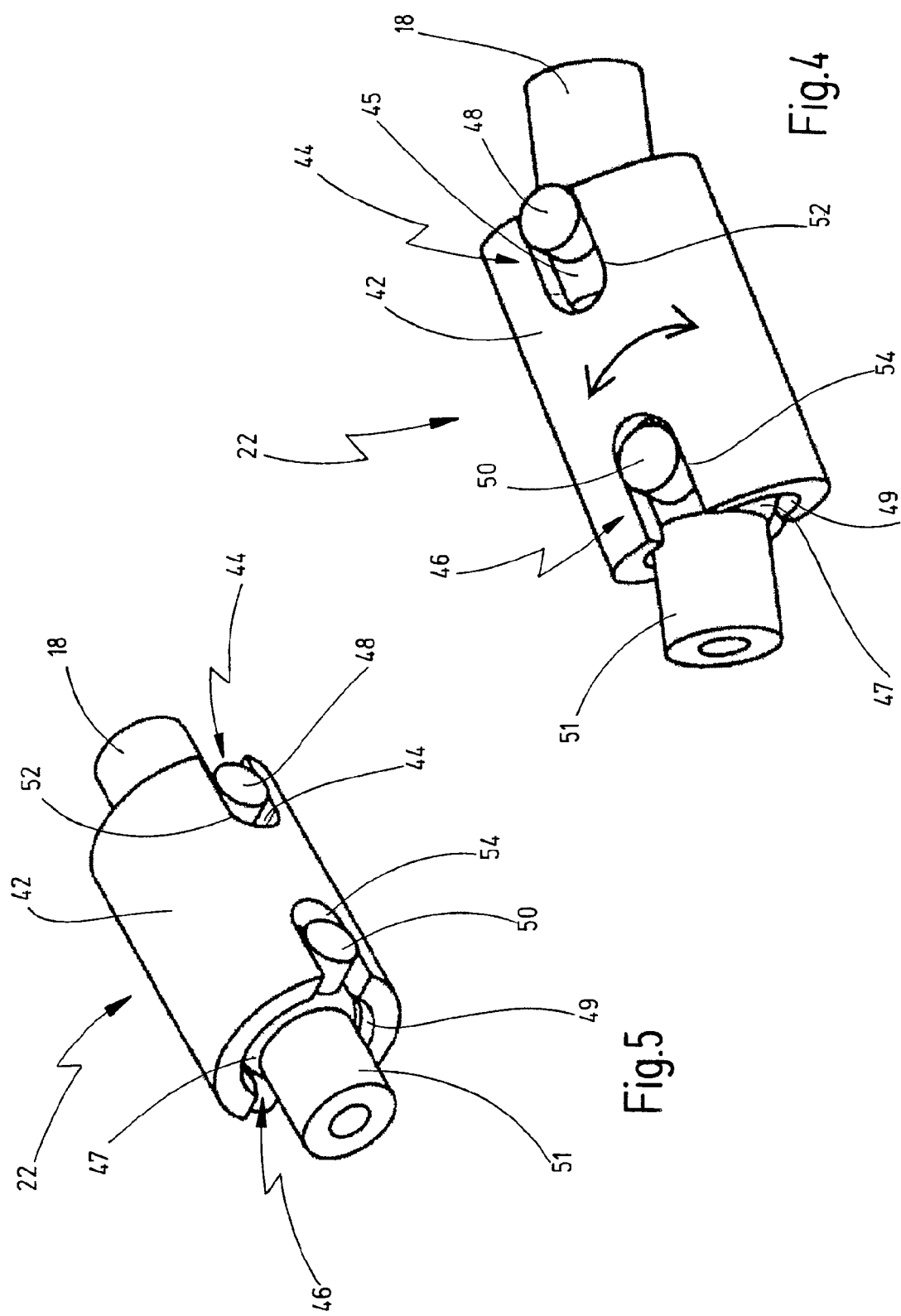

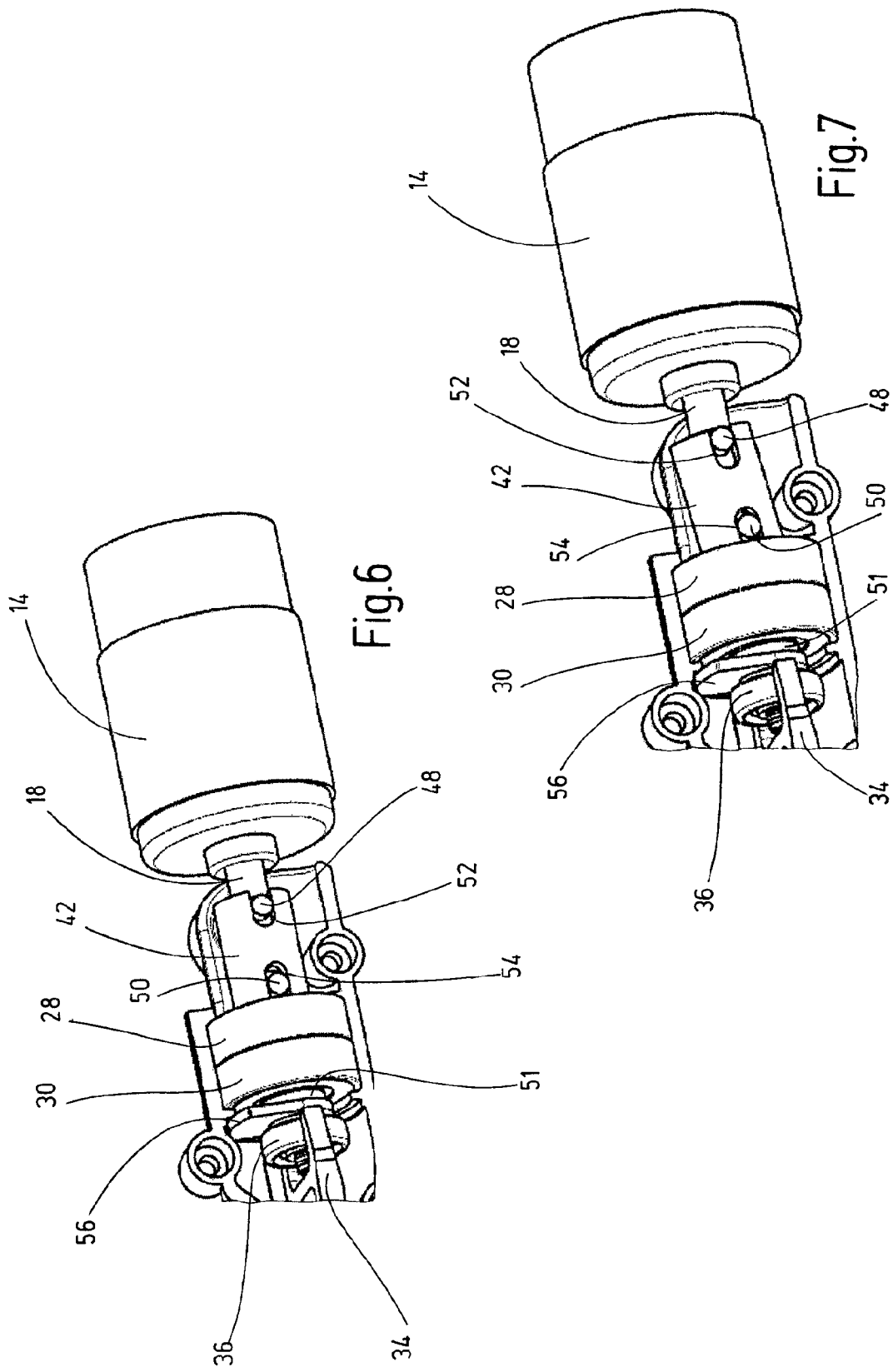

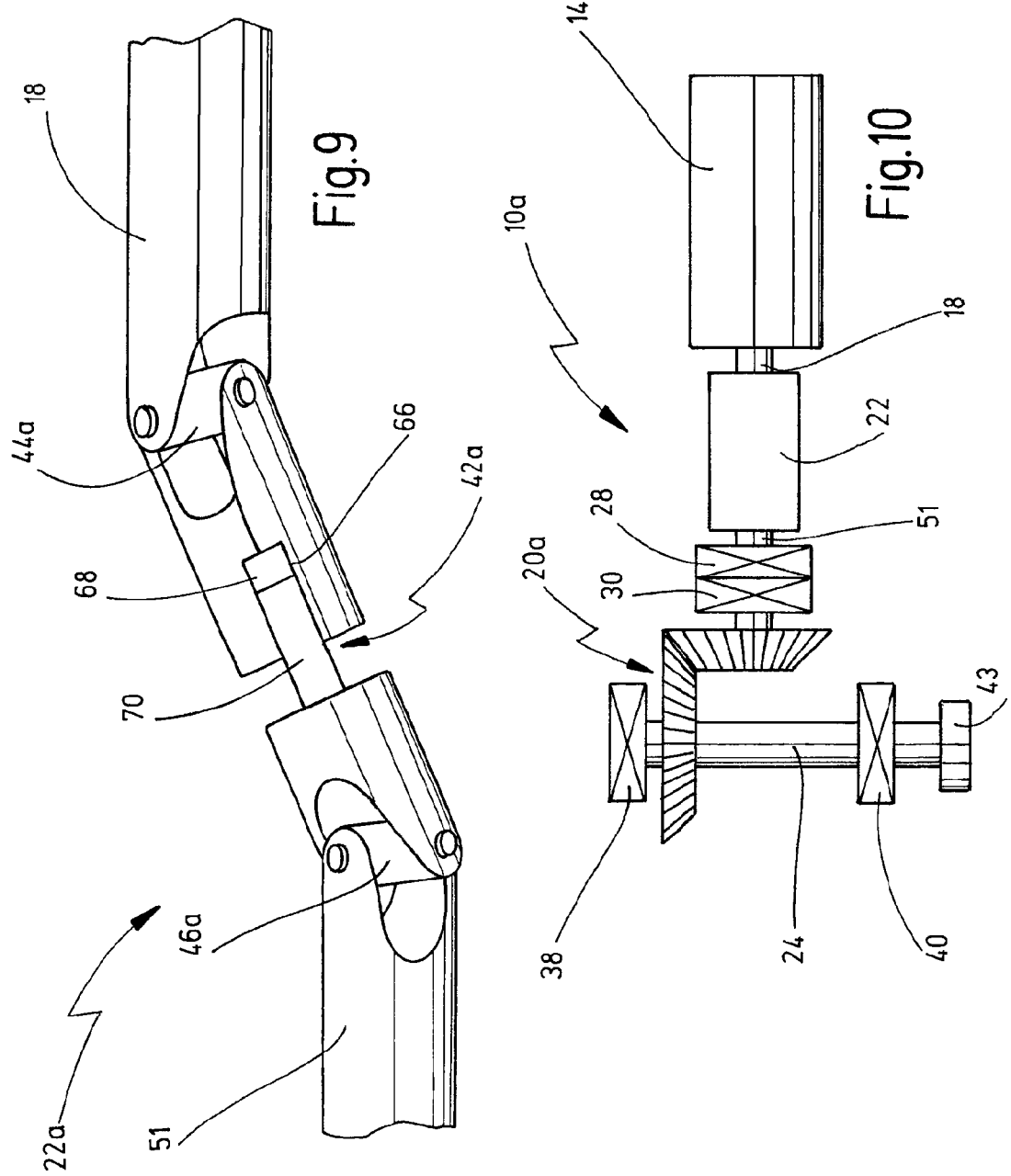

MACHINE TOOL

CROSS REFERENCES TO RELATED APPLICATIONS

This application claims priority from German patent application 10 2013 104 271.6, filed on Apr. 26, 2013. The entire content of this priority application is incorporated herein by reference.

BACKGROUND OF THE INVENTION

The invention relates to a motor-driven machine tool with a drive motor, the motor shaft of which is driven in rotation, with a tool drive shaft, which is driven in rotation or in oscillation about its longitudinal axis, and with a coupling drive for converting the rotational movement of the motor shaft into a driving movement of the tool drive shaft.

Machine tools of this type have been known for decades and are used in many different ways particularly as hand-held electric tools. In this context, there are both machines in which the tool drive shaft executes a rotating rotational movement, such as, for example, in drilling machines or angle grinders. Furthermore, in recent years, machines with an oscillating driving movement of the tool drive shaft have become increasingly common, and in this case the tool drive shaft can be driven in oscillation about its longitudinal axis. Oscillating machines tools of this type are used in many different ways for grinding, cutting or sawing, etc.

Particularly in the case of machine tools driven in oscillation, but also in specific machine tools having a tool drive shaft driven in rotation, such as in angle grinders, there is a problem that vibrations may occur which have an adverse effect upon the service life of the machine and are felt by the user to be a disadvantage.

If the motor shafts and the tool drive shaft are not oriented concentrically or axially parallel to one another, one-sided stresses upon the bearings occur, and, in course of time, overloads, premature defects or failures may possibly arise.

In machine tools driven in oscillation, the rotary driving movement of the motor shaft is converted into an oscillating driving movement of the tool drive shaft by means of a suitable coupling drive. In this case, a relative movement may occur between the drive motor and the coupling drive as a result of vibrational decoupling or damping. In this case, too, concentric and axially parallel orientation of the motor axis and tool drive shaft is therefore no longer possible.

EP 2 139 647 B1 discloses a machine tool driven in oscillation, according to the precharacterizing clause of Claim 1, in which length compensation, for example using a star-shaped profile which engages into a bore with corresponding profiling, is provided between the drive shaft and motor drive shaft.

However, a design of this kind allows only length compensation in the region of the drive chain.

SUMMARY OF THE INVENTION

In view of this, it is a first object on which the invention to disclose a machine tool which tolerates a non-axially parallel arrangement of a motor shaft and tool drive shaft.

It is a second object of the invention to disclose a machine tool which reduces oscillations.

It is a third object of the invention to disclose a machine tool which keeps the loads of the mounting and coupling drive between the motor shaft and tool drive shaft at a small level.

In one aspect of the invention these and other objects are solved by a motor-driven machine tool, comprising:
   a drive motor rotatingly driving a motor shaft;
   a tool drive shaft having a longitudinal axis about which said tool drive shaft is driven oscillatingly;
   a coupling drive coupled to said tool drive shaft for driving said tool drive shaft oscillatingly about said longitudinal axis thereof; and
   a coupling coupled to said motor shaft at one end thereof and coupled to said coupling drive at another end thereof configured for transferring a rotary motion of said motor shaft to said coupling drive and for compensating an angular offset between said motor shaft and tool drive shaft deviating from an axially parallel or a right-angled arrangement of said motor shaft and said tool drive shaft.

According to another aspect of the invention these and other objects are solved by a motor-driven machine tool, comprising:
   a drive motor rotatingly driving a motor shaft;
   a tool drive shaft having a longitudinal axis about which said tool drive shaft is driven oscillatingly or rotatingly;
   a coupling drive coupled to said tool drive shaft for driving said tool drive shaft about said longitudinal axis thereof; and
   a coupling coupled to said motor shaft at one end thereof and coupled to said coupling drive at another end thereof configured for transferring a rotary motion of said motor shaft to said coupling drive and for compensating an angular offset between said motor shaft and tool drive shaft deviating from an axially parallel or a right-angled arrangement of said motor shaft and said tool drive shaft;
   wherein said coupling further comprises:
   a coupling shaft having a drive side and a driven side;
   a first articulated connection comprising a first spherical head and two first drive bolts, said first spherical head being guided on an inner surface of said coupling shaft and driving said coupling shaft via said two first drive bolts;
   a second articulated connection comprising a second spherical head and two second drive bolts, said second spherical head being guided on an inner surface of said coupling shaft and driving said coupling shaft via said two second drive bolts; and
   a sliding articulated connection being arranged between said drive side and said driven side of said coupling shaft.

According to another aspect of the invention these and other objects are solved by a motor-driven machine tool, comprising:
   a drive motor rotatingly driving a motor shaft;
   a tool drive shaft having a longitudinal axis about which said tool drive shaft is oscillatingly driven;
   an eccentric coupling being configured for converting a rotary driving movement of said motor shaft into an oscillating movement of said tool drive shaft about said longitudinal axis thereof;
   a coupling coupled to said motor shaft at one end thereof and coupled to said coupling drive at another end thereof configured for transferring a rotary motion of said motor shaft to said coupling drive and for compensating an angular offset between said motor shaft and tool drive shaft deviating from an axially parallel or a right-angled arrangement of said motor shaft and said tool drive shaft;
   wherein said coupling further comprises:

a coupling shaft having a drive side and a driven side;

a first articulated connection comprising a first spherical head and two first drive bolts, said first spherical head being guided on an inner surface of said coupling shaft and driving said coupling shaft via said two first drive bolts;

a second articulated connection comprising a second spherical head and two second drive bolts, said second spherical head being guided on an inner surface of said coupling shaft and driving said coupling shaft via said two second drive bolts; and a sliding articulated connection being arranged between said drive side and said driven side of said coupling shaft.

According to the invention, by means of the additional coupling, the risk of vibrations as a consequence of a design-induced offset or angular errors of the motor axis with respect to a concentric or axially parallel orientation to the tool drive shaft is markedly reduced. Moreover, the risk of overloads of the bearing points and of the material in the drive chain is markedly reduced. In the case of vibrationally decoupled machine tools with a tool drive shaft driven in oscillation, the risk of overloads of the bearing points is markedly reduced and at the same time the vibrational load is restricted.

In an advantageous refinement of the invention, the coupling comprises a coupling shaft which is coupled on a drive shaft to the motor shaft via a first articulated connection and which is coupled on a driven side to the coupling drive via a second articulated connection, at least one sliding articulated connection being provided between the drive side and the driven side.

By means of a design of this kind, angular errors and variations in position between the motor shaft and the tool drive shaft or the coupling drive arranged between them can be compensated.

In this case, the first articulated connection may comprise, for example, a first spherical head which is guided on an inner surface of the coupling shaft and which drives the coupling shaft via two first drive bolts, the second articulated connection comprising a second spherical head which is guided on an inner surface of the coupling shaft and which is driven by the coupling shaft via two second drive bolts.

According to a development of this design, the coupling shaft is designed as a hollow shaft with an inner surface, on which the first and the second spherical head are guided.

According to a further refinement of this design, the first or the second drive bolts are received longitudinally displaceably in grooves of the coupling shaft.

Preferably, both the first and the second drive bolts are guided longitudinally displaceably in slots in a wall of the coupling shaft.

These measures make it possible to have a simple configuration of the coupling which compensates both an angular offset and an offset in position between the motor shaft and tool drive shaft or between the motor shaft and coupling drive.

In an alternative design of the invention, at least one of the articulated connections may also be designed as a cardan joint, or both articulated connections may be designed as a cardan joint, in addition, a sliding articulated connection being integrated into the coupling shaft.

In this way, too, an angular offset or variation in position between the motor shaft and tool drive shaft or between the motor shaft and coupling drive is compensated. However, the design with one or two articulated connections as a cardan joint is more complicated than the abovementioned design and may possibly lead to somewhat higher bearing stress or somewhat increased load due to vibrations.

Even such a design nevertheless makes it basically possible to reduce the bearing load and the vibration load, as compared with conventional machine tools without a coupling of this type.

According to a further refinement of the invention, a housing is provided, with a motor housing portion for receiving the drive motor and with a gear housing portion for receiving the tool drive shaft and preferably the coupling drive, means being provided which allow relative movements between the tool drive shaft and the drive motor.

In this case, for example, the motor housing portion and the gear housing portion may be connected flexibly to one another.

Alternatively or additionally, at least one damping element for vibrational decoupling may be provided between the coupling drive and the drive motor.

If relative movements between the tool drive shaft and the drive motor are possible, fewer vibrations are transmitted to the drive motor. If the machine tool is held by hand in the region of the motor housing, markedly fewer vibrations are transmitted to the user. The reduction of vibrations of the drive motor and the accumulator in connection with the latter also has an advantageous effect upon the service life.

Compensating movements between the drive motor and tool drive shaft or coupling drive or between the gear housing and the motor housing are absorbed by the coupling.

By at least one damping element being arranged between the coupling drive and the drive motor, the vibrations are further reduced.

According to a further refinement of the invention, the coupling drive has an eccentric coupling drive for converting a rotary driving movement of the motor shaft into an oscillating movement of the tool drive shaft about its longitudinal axis.

In an alternative way according to the invention, the tool drive shaft is driven in rotation, the machine being designed as an angle grinder in which the coupling drive is designed as an angular gear, in particular as a bevel gear.

Even in a design of this kind, the advantages of the invention are afforded by a reduction in the bearing load and the possible compensational vibrations which may occur during operation.

It would be appreciated that the features of the invention which are mentioned above and those which are yet to be explained below can be used not only in the combination specified in each case, but also in other combinations or alone, without departing from the scope of the invention.

BRIEF DESCRIPTION OF THE DRAWINGS

Further features and advantages of the invention may be gathered from the description of preferred exemplary embodiments and are explained in more detail with reference to the drawing in which:

FIGS. 4 and 5 show perspective views of the coupling according to FIGS. 1 to 3 in an enlarged illustration in two different rotary positions;

FIG. 6 shows in perspective a detail in the region of the drive motor, of the coupling and of the coupling gear according to FIG. 3;

FIG. 7 shows a view according to FIG. 6 with a slightly changed arrangement between the motor shaft and coupling gear;

FIG. 9 shows a diagrammatic illustration of a modification of the coupling according to FIGS. 4 and 5, and FIG. 10 shows a simplified diagrammatic illustration of the gear arrangement in the angle grinder according to FIG. 8.

DESCRIPTION OF PREFERRED EMBODIMENTS

Figure 1:
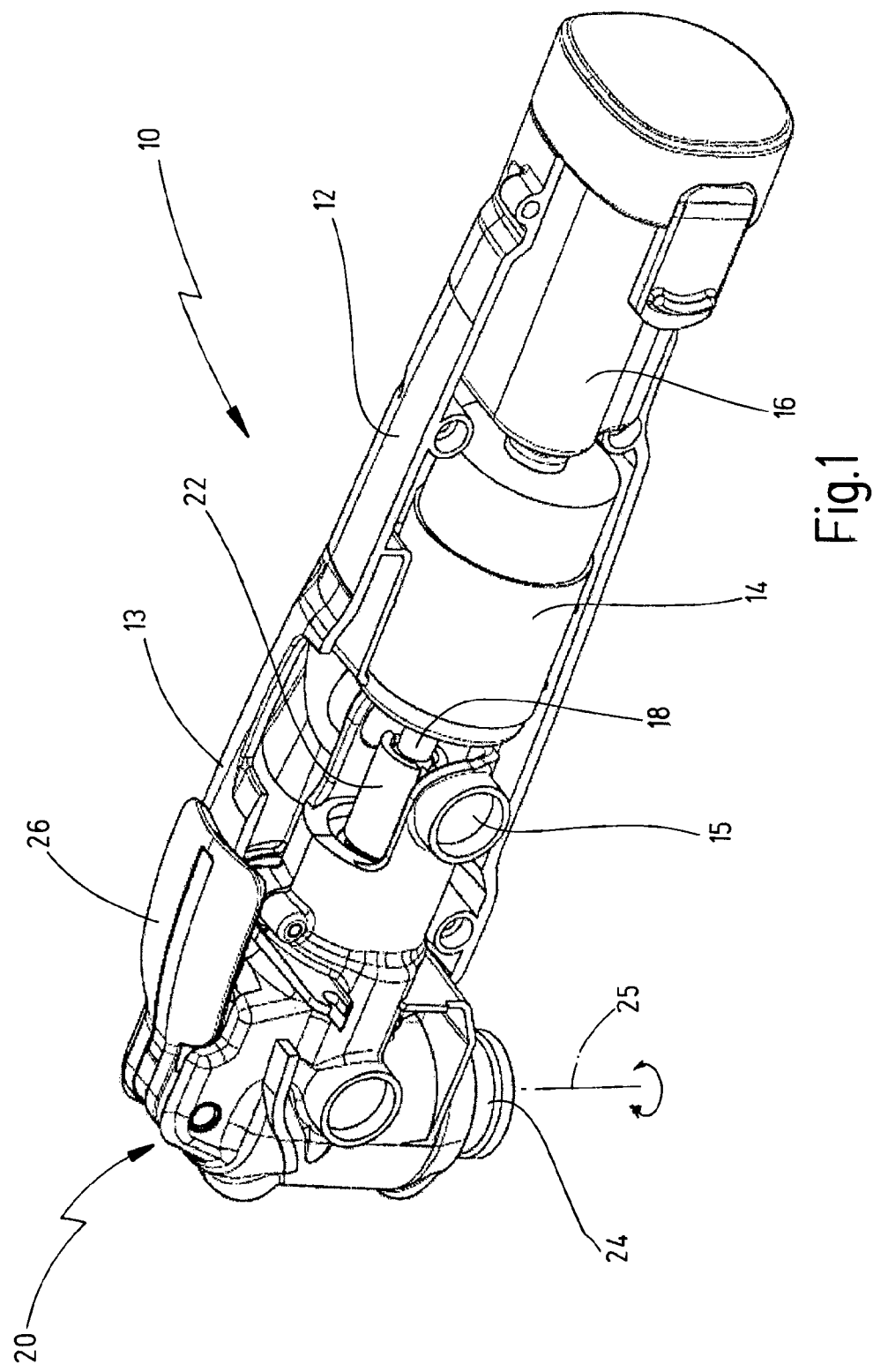
FIG. 1 shows a first perspective view of a machine tool according to the invention with a tool drive shaft driven in oscillation, one housing half being removed.
Figure 2:
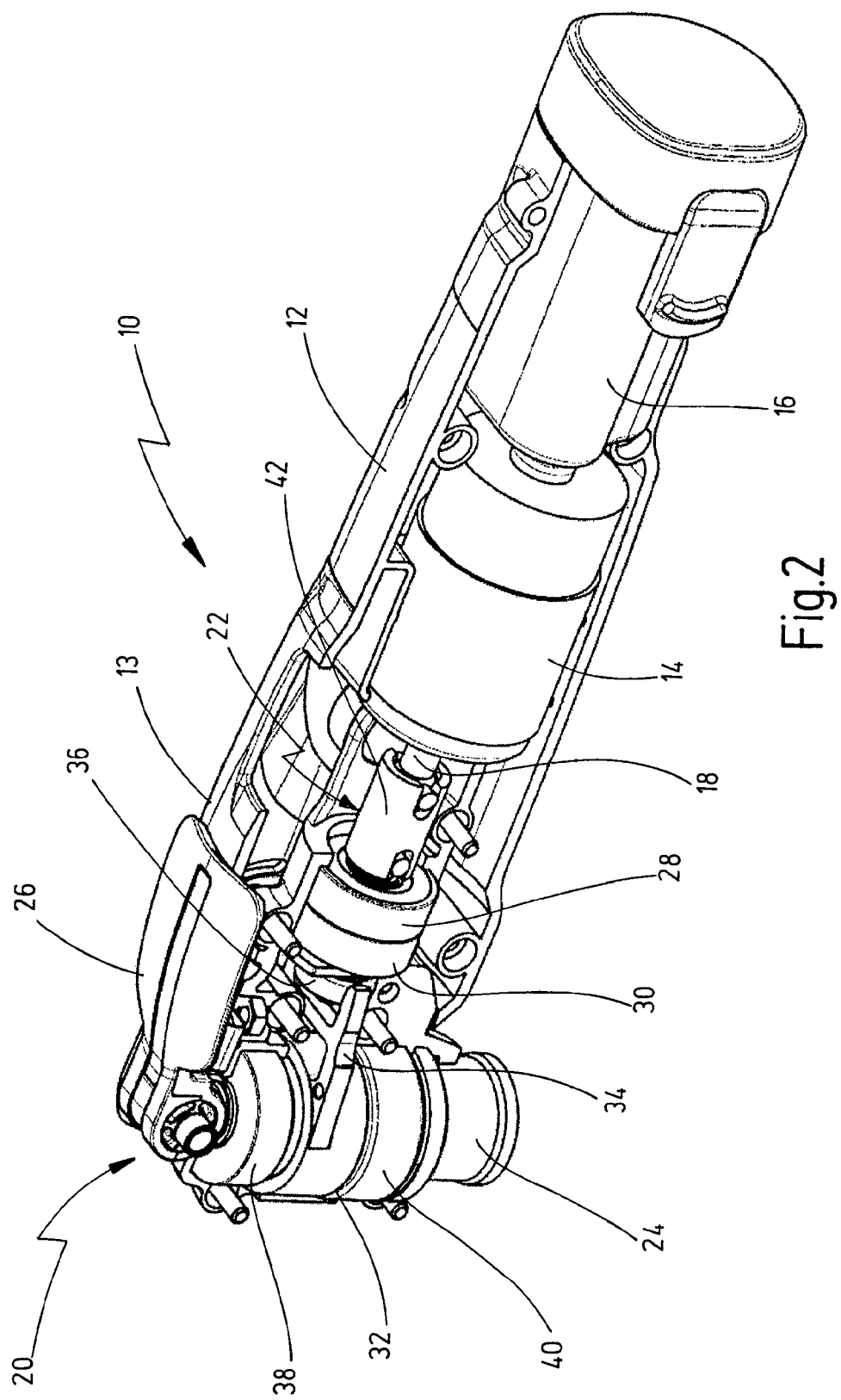
FIG. 2 shows a partially cut away view according to FIG. 1, from which further details are clear.
Figure 3:
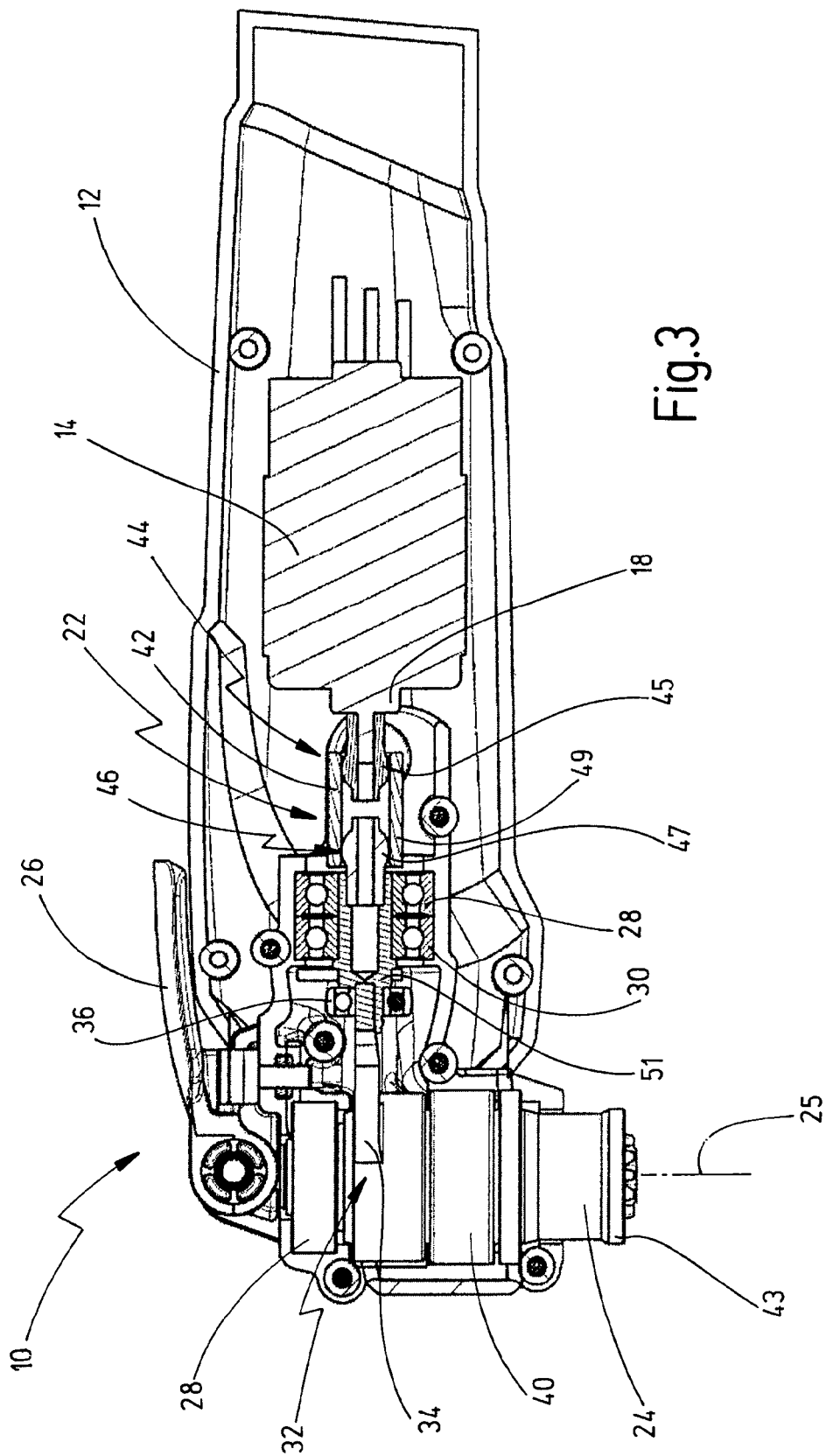
FIG. 3 shows a longitudinal section through a machine tool according to FIG. 1.

In FIGS. 1 to 3, a first version of a machine tool according to the invention is designated as a whole by the numeral 10. This is a machine tool 10 driven in oscillation, with a motor housing 12, in which a drive motor 14 is received, and with a gear housing 13, in which a tool drive shaft 24 is received. A rotational movement of the motor shaft 18 is converted via a coupling 22 and an assigned coupling drive 20 into an oscillatingly driven driving movement of the tool drive shaft 24 about its longitudinal axis 25.

At the outer end of the tool drive shaft 24, which end projects outwards from the housing 12, a tool-holding fixture 43 (FIG. 3) is provided, to which an assigned tool, for example a grinding, cutting or sawing tool, can be fastened by means of a quick-action chucking device (not illustrated) with the aid of a tension lever 26. The tool drive shaft 24 is mounted on the housing 12 with the aid of two bearings 38, 40 (FIGS. 2 and 3).

The drive motor 14, via its motor shaft 18, drives a coupling 22, having a first articulated connection 44 on the side of the motor shaft 18 with a first spherical head 45 and having a second articulated connection 46 on the driven side with a second spherical head 47. The second spherical head 47 is connected to an intermediate shaft 51 which is mounted on the housing 12 by means of two bearings 28, 30 and which drives the tool drive shaft 24 in oscillation via the coupling drive 20.

For this purpose, an eccentric coupling drive 32 is provided, which has on the intermediate shaft 51 an eccentric bearing 36, on which an eccentric lever 34 connected fixedly in terms of rotation to the tool drive shaft 24 engages on both sides. The eccentric lever 34 can be seen in more detail particularly from FIG. 2. It has a fork of U-shaped design, both ends of which surround the eccentric bearing 36 from outside. An eccentric movement of the eccentric bearing 36 on the end of the intermediate shaft 51 is thereby converted into an oscillating movement of the tool drive shaft 24 about its longitudinal axis 25.

The eccentric coupling drive 32 and the tool drive shaft 24 are decoupled vibrationally from the drive motor 14. For this purpose, a damping element 15 is arranged on each of the two sides in the transitional region between the motor housing 12 and the gear housing 13, so that certain flexibility between the motor housing 12 and gear housing 13 and, in addition, vibration damping are afforded. Only a receptacle for a damping element 15 can be seen in FIG. 1. A rubber plug is received therein as a damping element.

The transmission of vibrations from the tool drive shaft 24 and the eccentric coupling drive 32 to the drive motor 14 and the accumulator 16 connected to the latter is thereby reduced. The user who holds the machine tool 10 at the motor housing 12 experiences appreciably fewer vibrations.

The more detailed configuration of the coupling 22 provided between the coupling drive 20 and the drive motor 14 can be seen particularly from FIGS. 4 and 5.

The coupling 22 has a hollow-cylindrical coupling shaft 42 which is driven by the motor shaft 18 via a first articulated connection 44 and which drives the intermediate shaft 51 via a second articulated connection 46.

The first articulated connection 44 has a first spherical head 45 which is connected rigidly and fixedly in terms of rotation to the end of the motor shaft 18. Two first drive bolts 48 project laterally from the first spherical head 45 towards the two sides lying opposite one another and are guided in assigned slots 52 in the surface area of the coupling shaft 42. The first spherical head 45 is guided circumferentially on a cylindrical inner surface 49 of the coupling shaft 42.

The second articulated connection 46 has a second spherical head 47 which is connected to the tool drive shaft 24 and which is likewise guided on the hollow-cylindrical inner surface 49 of the coupling shaft 42. Also provided on the second spherical head 47 are two second drive bolts 50 which lie opposite one another and which are guided longitudinally displaceably in assigned slots 54 in the surface area of the coupling shaft 42. The second spherical head 47 is connected rigidly and fixedly in terms of rotation to the intermediate shaft 51.

The coupling 22 allows an angular offset and a variation in position between the motor shaft 18 and the intermediate shaft 51.

Should an exact orientation between the intermediate shaft 51 and the motor shaft 18 therefore vary, for example as a result of vibrations, the coupling 22 makes flexible compensation possible. It is likewise conceivable to arrange the intermediate shaft 51 and the motor shaft 18 so as to be offset angularly or positionally with respect to one another.

FIGS. 6 and 7 show different arrangements between the intermediate shaft 51 and the motor shaft 18. Whereas, in the version according to FIG. 6, these are oriented in alignment with one another, in the version according to FIG. 7 there is a marked angular offset between the motor shaft 18 and the intermediate shaft 51. This angular offset is compensated by the coupling 22.

FIGS. 6 and 7 additionally illustrate on the intermediate shaft 51 a balancing weight 56 which is provided for mass balancing during the rotation of the eccentric bearing 36.

One possible modification of the coupling described above is illustrated in FIG. 9 and is designated as a whole by 22a. In this case, corresponding reference numerals are used for corresponding parts and are partially supplemented by "a".

In this case, the motor shaft 18 drives the coupling shaft 42a via a first articulated connection 44a in the form of a cardan joint, while the driven end of the coupling shaft 42a drives the intermediate shaft 51 via a second articulated connection 46a in the form of a cardan joint connection. The coupling shaft 42a comprises, furthermore, a sliding articulated connection which is indicated diagrammatically by 66 and which may comprise, for example, a slot 68, into which an assigned slide 70 engages.

It would be appreciated that other configurations of a sliding articulated connection may also be used, for example a slide, for example in the form of a polygon, which is guided on an assigned inner surface of a counterpiece.

In principle, a coupling 22a of this type with two cardan joint connections 44a, 46a and with a sliding articulated connection 66 is also possible in order to bring about angular compensation and positional compensation between the motor shaft 18 and intermediate shaft 51. However, the above-described version of the coupling 22 according to FIGS. 1 to 7, which has overall a simpler set-up, is preferred.

Figure 8:
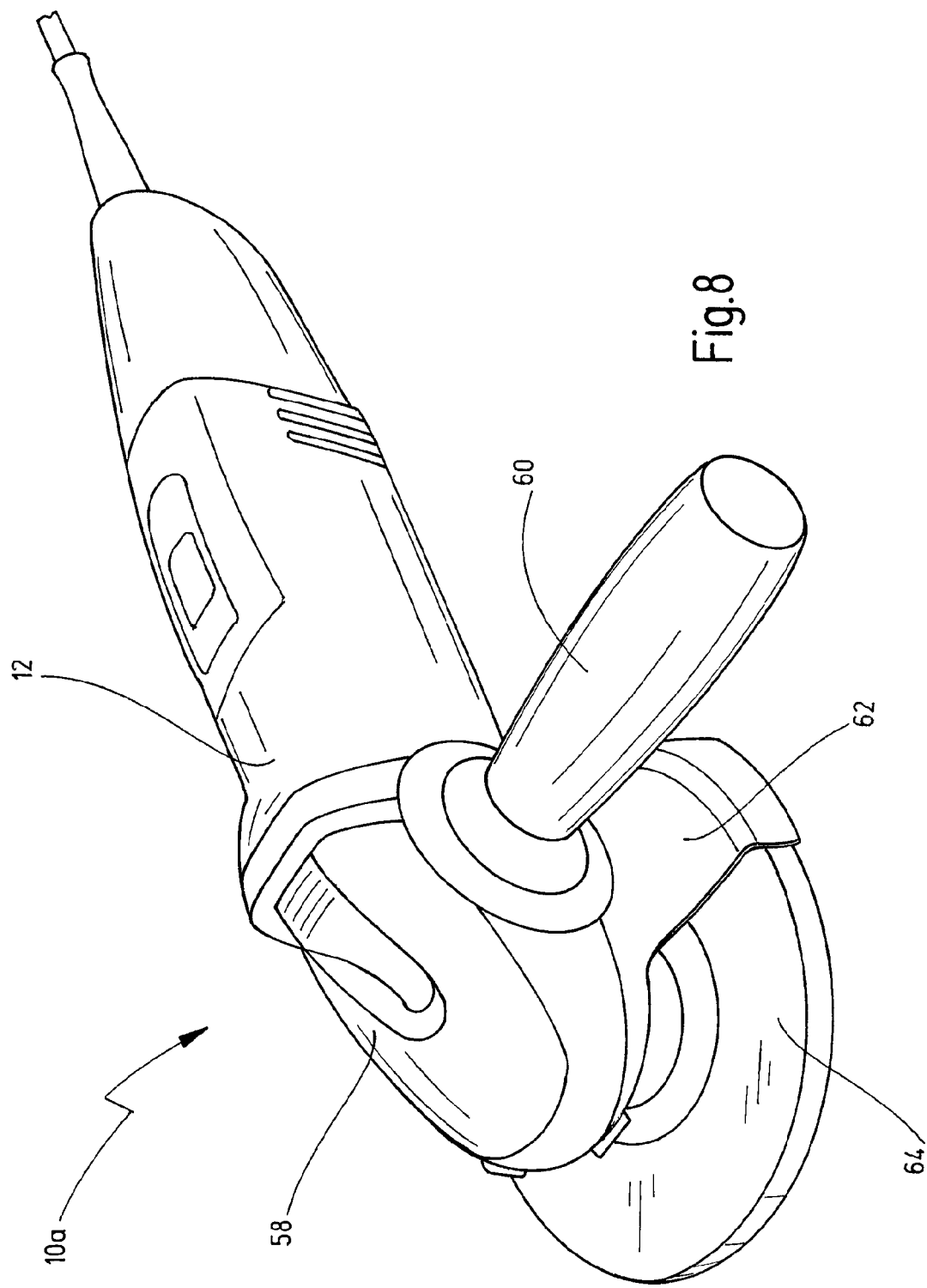
FIG. 8 shows a perspective view of a further machine tool according to the invention with a rotating tool drive shaft in the form of an angle grinder.

A modification of the machine tool according to the invention is illustrated in FIGS. 8 and 10 and is designated as a whole by 10a.

This is a configuration of the machine tool in the form of an angle grinder with a gear head 58 according to FIG. 8, with a lateral handle 60 for holding the machine and with a conventional protective hood 62 which serves as burst protection for a tool in the form of a grinding wheel or cut-off wheel.

As is clear from FIG. 10, in this case the coupling drive 20a received in the gear head 58 is constructed as an angular bevel gear. The tool drive shaft 24 mounted by means of two bearings 38, 40 is thus driven in rotation. The motor shaft 18 of the drive motor 14 drives the intermediate shaft, mounted by means of two bearings 28, 30, via a coupling 22 according to the configuration described above with reference to FIGS. 4 and 5. Located on the intermediate shaft 51 is a driving pinion in the form of a bevel gearwheel which drives an assigned driven wheel in the form of a bevel gearwheel on the tool drive shaft 24.

In this version, too, the additional coupling 22 serves for the reduction of vibrations which may occur when the angle grinder is in operation. Moreover, the coupling 22 makes it possible to use an angular or positional offset between the motor shaft 18 and intermediate shaft 51. The coupling drive 20a with the bevel gear could also be designed to be at an angle deviating from 90°.

The coupling 22 or 22a allows positional and angular variations between the drive shaft 24 and motor shaft 18 during operation. It is therefore expedient to provide certain flexibility in the mounting of, for example, the coupling drive 20 or 20a or of the tool drive shaft 24 or motor shaft 18, in order to permit compensating movements which may arise during operation. For this purpose, it is sufficient to provide certain flexibility between the motor housing 12 and the gear housing 13. Advantageously, however, damping elements 15 are additionally provided for vibration damping in the transitional region between the motor housing 12 and gear housing 13, as has already been explained above.

What is claimed is:

1. A motor-driven machine tool, comprising:
   a drive motor rotatly driving a motor shaft;
   a tool drive shaft having a longitudinal axis about which said tool drive shaft is oscillatingly driven;
   an eccentric coupling being configured for converting a rotary driving movement of said motor shaft into an oscillating movement of said tool drive shaft about said longitudinal axis thereof;
   a coupling coupled to said motor shaft at one end thereof and coupled to said eccentric coupling at another end thereof configured for transferring a rotary motion of said motor shaft to said eccentric coupling and for compensating an angular offset between said motor shaft and tool drive shaft;
   wherein said coupling further comprises:
   a coupling shaft having a drive side and a driven side;
   a first articulated connection comprising a first spherical head and two first drive bolts, said first spherical head being guided on an inner surface of said coupling shaft and driving said coupling shaft via said two first drive bolts;
   a second articulated connection comprising a second spherical head and two second drive bolts, said second spherical head being guided on an inner surface of said coupling shaft and driving said coupling shaft via said two second drive bolts; and
   wherein at least one of said first articulating connection and said second articulating connection provide for a sliding connection being arranged between said drive side and said driven side of said coupling shaft.

2. The machine tool of claim 1, wherein said coupling shaft is configured as a hollow shaft having an inner surface, wherein said first and second spherical heads are guided.

3. The machine tool of claim 2, wherein said coupling shaft further comprises grooves wherein at least said first or said second drive bolts are received longitudinally displaceably.

4. The machine tool of claim 3, wherein said coupling shaft further comprises a wall having slots wherein said first and second drive bolts are guided longitudinally displaceably.

5. The machine tool of claim 4, further comprising a housing having a motor housing portion for receiving said drive motor, and having a gear housing portion for receiving said tool drive shaft and said coupling drive.

6. The machine tool of claim 5, wherein said motor housing portion and said gear housing portion are connected flexibly to one another.

7. The machine tool of claim 6, further comprising at least one damping element arranged between said coupling drive and said drive motor.

8. The machine tool of claim 1, further comprising a housing having a motor housing portion for receiving said drive motor, and having a gear housing portion for receiving said tool drive shaft and said coupling drive.

9. The machine tool of claim 8, wherein said motor housing portion and said gear housing portion are connected flexibly to one another.

10. The machine tool of claim 9, further comprising at least one damping element arranged between said coupling drive and said drive motor.

11. A motor-driven machine tool, comprising:
    a drive motor rotatly driving a motor shaft;
    a tool drive shaft having a longitudinal axis about which said tool drive shaft is driven oscillatingly or rotatingly;
    a coupling drive coupled to said tool drive shaft for driving said tool drive shaft about said longitudinal axis thereof; and
    a coupling coupled to said motor shaft at one end thereof and coupled to said coupling drive at another end thereof configured for transferring a rotary motion of said motor shaft to said coupling drive and for compensating an angular offset between said motor shaft and tool drive shaft;
    wherein said coupling further comprises:
    a coupling shaft having a drive side and a driven side;
    a first cardan joint connected to said drive side of said coupling shaft;
    a second cardan joint connected to said driven side of said coupling shaft; and
    a sliding articulated connection being arranged between said drive side and said driven side of said coupling shaft.

12. The machine tool of claim 11, wherein said coupling drive comprises an eccentric coupling drive for converting a rotary driving movement of said motor shaft into an oscillating movement of said tool drive shaft about said longitudinal axis thereof.

13. A motor-driven machine tool, comprising:
    a drive motor rotatingly driving a motor shaft;

a tool drive shaft having a longitudinal axis about which said tool drive shaft is driven oscillatingly or rotatingly;

a coupling drive coupled to said tool drive shaft for driving said tool drive shaft about said longitudinal axis thereof; and a coupling coupled to said motor shaft at one end thereof and coupled to said coupling drive at another end thereof configured for transferring a rotary motion of said motor shaft to said coupling drive and for compensating an angular offset between said motor shaft and tool drive shaft;

wherein said coupling further comprises:

a coupling shaft having a drive side and a driven side;

a first articulated connection comprising a first spherical head and two first drive bolts, said first spherical head being guided on an inner surface of said coupling shaft and driving said coupling shaft via said two first drive bolts;

a second articulated connection comprising a second spherical head and two second drive bolts, said second spherical head being guided on an inner surface of said coupling shaft and driving said coupling shaft via said two second drive bolts; and wherein at least one of said first articulating connection and said second articulating connection provide for a sliding connection being arranged between said drive side and said driven side of said coupling shaft.

\* \* \* \* \*